United States Patent
Zhang et al.

(10) Patent No.: US 11,659,384 B2
(45) Date of Patent: May 23, 2023

(54) DATA CENTER 5G NETWORK ENCRYPTED MULTICAST-BASED AUTHORITY AUTHENTICATION METHOD AND SYSTEM

(71) Applicant: INSPUR SUZHOU INTELLIGENT TECHNOLOGY CO., LTD., Jiangsu (CN)

(72) Inventors: Xin Zhang, Jiangsu (CN); Xiaotong Wang, Jiangsu (CN); Wanxian He, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/796,015

(22) PCT Filed: Feb. 19, 2021

(86) PCT No.: PCT/CN2021/076837
§ 371 (c)(1),
(2) Date: Jul. 28, 2022

(87) PCT Pub. No.: WO2021/253852
PCT Pub. Date: Dec. 23, 2021

(65) Prior Publication Data
US 2023/0065801 A1 Mar. 2, 2023

(30) Foreign Application Priority Data
Jun. 14, 2020 (CN) .......................... 202010539423.6

(51) Int. Cl.
*H04L 29/06* (2006.01)
*H04W 12/041* (2021.01)
(Continued)

(52) U.S. Cl.
CPC ....... *H04W 12/041* (2021.01); *H04W 12/033* (2021.01); *H04W 12/10* (2013.01)

(58) Field of Classification Search
None
See application file for complete search history.

(56) References Cited

U.S. PATENT DOCUMENTS

| 11,568,485 B2 * | 1/2023 | Katsuyama | ............. H04L 47/12 |
| 11,570,098 B2 * | 1/2023 | Ignatchenko | ........... H04L 45/74 |

(Continued)

FOREIGN PATENT DOCUMENTS

| CN | 101355720 A | 1/2009 |
| CN | 101610254 A | 12/2009 |

(Continued)

OTHER PUBLICATIONS

Gharavi, Hamid; Hu, Bin. 4-way handshaking protection for wireless mesh network security in smart grid. 2013 IEEE Global Communications Conference (GLOBECOM). https://ieeexplore.ieee.org/stamp/stamp.jsp?tp=&arnumber=6831169 (Year: 2013).*

(Continued)

*Primary Examiner* — Jeremiah L Avery
(74) *Attorney, Agent, or Firm* — Cooper Legal Group, LLC

(57) ABSTRACT

A data center 5th-Generation (5G) network encrypted multicast-based authority authentication method, system, and device, and a medium. In the present disclosure, authority authentication and data connection are performed on each platform of a data center by 5G network encrypted multicast, and a network encrypted multicast component is configured on the platform of the data center. An encrypted multicast packet is sent to a network by the platform. Connection is completed by handshaking and mutual heartbeat transmission between the platforms. Authority verification is per- (Continued)

formed through the multicast packet. In this manner, the problem of security risk of traditional authority authentication may be reduced, and the intercommunication speed and efficiency of each platform of the data center may be improved greatly.

20 Claims, 2 Drawing Sheets

(51) Int. Cl.
*H04W 12/10* (2021.01)
*H04W 12/033* (2021.01)

(56) References Cited

U.S. PATENT DOCUMENTS

| | | | |
|---|---|---|---|
| 11,573,558 B2* | 2/2023 | Cella | G05B 23/0283 |
| 2006/0282662 A1* | 12/2006 | Whitcomb | H04L 63/0407 713/156 |
| 2008/0320151 A1* | 12/2008 | McCanne | H03M 7/30 709/228 |
| 2013/0315389 A1 | 11/2013 | Jung et al. | |
| 2014/0025321 A1* | 1/2014 | Spanier | G01R 21/133 702/62 |
| 2014/0195801 A1 | 7/2014 | Benshetler et al. | |
| 2017/0366983 A1* | 12/2017 | Gunasekara | H04L 43/0811 |
| 2019/0041835 A1* | 2/2019 | Celia | G05B 19/4183 |
| 2019/0230503 A1* | 7/2019 | Circosta | H04W 12/50 |
| 2019/0265222 A1* | 8/2019 | Troxler | G01N 9/00 |
| 2019/0386969 A1* | 12/2019 | Verzun | G06F 21/606 |
| 2020/0274854 A1* | 8/2020 | Mueller | H04L 9/0872 |
| 2020/0348662 A1* | 11/2020 | Cella | G05B 19/0426 |

FOREIGN PATENT DOCUMENTS

| | | |
|---|---|---|
| CN | 101692637 A | 4/2010 |
| CN | 102457347 A | 5/2012 |
| CN | 107743097 A | 2/2018 |
| CN | 110169104 A | 8/2019 |
| CN | 110912941 A | 3/2020 |
| CN | 111818521 A | 10/2020 |

OTHER PUBLICATIONS

Jaballah, Wafa Ben et al. Lightweight Source Authentication Mechanisms for Group Communications in Wireless Sensor Networks 2013 IEEE 27th International Conference on Advanced Information Networking and Applications (AINA), https://ieeexplore.ieee.org/stamp/stamp.jsp?tp=&arnumber=6531809 (Year: 2013).*

Chou, Chun-Ting; Shin, Kang G. Smooth handoff with enhanced packet buffering-and-forwarding in wireless/mobile networks. Second International Conference on Quality of Service in Heterogeneous Wired/Wireless Networks (QSHINE'05). https://ieeexplore.ieee.org/stamp/stamp.jsp?tp=&arnumber=1551099 (Year: 2005).*

International Search Report of corresponding PCT application PCT/CN2021/076837, dated May 17, 2021, 5 pgs.

Written Opinion of International Searching Authority of corresponding PCT application PCT/CN2021/076837, dated May 17, 2021, 9 pgs.

Search report of corresponding CN priority application CN202010539423.6, dated Apr. 11, 2022, 1 page.

* cited by examiner

DATA CENTER 5G NETWORK ENCRYPTED MULTICAST-BASED AUTHORITY AUTHENTICATION METHOD AND SYSTEM

This application claims priority to Chinese Patent Application No. 202010539423.6, filed on Jun. 14, 2020, in China National Intellectual Property Administration and entitled "Data Center 5G Network Encrypted Multicast-Based Authority Authentication Method and System", which is hereby incorporated by reference in its entirety.

FIELD

The present disclosure relates to the technical field of $5^{th}$-Generation (5G) network communication, and particularly to a data center 5G network encrypted multicast-based authority authentication method and system.

BACKGROUND 5G, i.e., 5G mobile communication technology, is a next-generation mobile communication network with a theoretical transmission speed reaching up to tens of Gigabytes (Gb) per second, which is hundreds of times faster than a $4^{th}$-Generation (4G) network, and thus a super-definition movie can be downloaded within 10 seconds. With the development of the 5G technology, smart terminals and digital life have been accessible to ordinary people. The 5G technology may be applied to 4K/8K and Virtual Reality (VR) live streaming in large-scale activities such as a competition, a concert, and other important activities, thereby bringing users more immersive and interactive experiences through the 5G network.

The current authority authentication mode for network access is generally relatively simple, and traditional authentication is performed by relying on a user name, a password, and a randomly generated verification code. However, this authority authentication mode involves no necessary security unified system, which is very dangerous and affects the secure access of the 5G network. Moreover, the current network authentication mode is relatively slow and unlikely to meet the requirement for the high speed of the 5G network.

SUMMARY

An objective of the present disclosure is to provide a data center 5G network encrypted multicast-based authority authentication method and system, so as to solve the problems of high risk and low speed of network authority authentication in the prior art and greatly improve the intercommunication speed and security of each platform of a data center.

In order to achieve the above objective, the present disclosure provides a data center 5G network encrypted multicast-based authority authentication method, including the following operations:

configuring, by platforms of the data center in a 5G network, a network encrypted multicast component, and configuring a user name and a password;

converting, by a platform authentication and access management server, the user name and password of the platform into information matrices, and matching the information matrices to verify the user name and the password;

configuring a network encrypted multicast key to encrypt a multicast packet sent to the network by the platforms;

the platforms discovering each other through encrypted multicast packets, handshaking, and storing Internet Protocol (IP) addresses and service types of each other locally;

after handshaking, interconnecting, by sending heartbeat, the platforms, encrypting a packet by date for targeted sending, and decrypting, by each platform, the packet based on local time after receiving the packet;

verifying a platform authority through the multicast packet.

In some embodiments, the multicast packet includes a local IP address, a local service type, a local unique identifier, a ciphertext, and a Media Access Control (MAC) address.

In some embodiments, the network encrypted multicast component has a unique identifier.

In some embodiments, the verifying a platform authority specifically includes:

A: checking whether a global IP white list is hit; if YES, determining that verification succeeds, and performing step D; otherwise, performing step B;

B: checking whether a user IP white list is hit; if YES, determining that verification succeeds, and performing step D; otherwise, performing step C;

C: verifying a ciphertext, throwing an exception if verification fails, and performing step D if verification succeeds;

D: verifying an authority required by a request of a user and an authority of the user, and throwing an exception if verification fails.

The present disclosure also provides a data center 5G network encrypted multicast-based authority authentication system, including:

a multicast component configuration module, configured to configure, by platforms of the data center in a 5G network, a network encrypted multicast component, and configure a user name and a password;

a user name and password verification module, configured to convert, by a platform authentication and access management server, the user name and password of the platform into information matrices, and match the information matrices to verify the user name and the password;

a key configuration module, configured to configure a network encrypted multicast key to encrypt a multicast packet sent to the network by the platforms;

a handshaking module, configured for the platforms discovering each other through encrypted multicast packets, handshaking, and storing Internet Protocol (IP) addresses and service types of each other locally;

an interconnection module, configured to, after handshaking, interconnect, y sending heartbeat, the platforms, encrypt a packet by date for targeted sending, and decrypt, by each platform, the packet based on local time after receiving the packet;

an authority verification module, configured to verify a platform authority through the multicast packet.

In some embodiments, the multicast packet includes a local IP address, a local service type, a local unique identifier, a ciphertext, and a MAC address.

In some embodiments, the network encrypted multicast component has a unique identifier.

The present disclosure also provides a data center 5G network encrypted multicast-based authority authentication device, including:

a memory, configured to store a computer program; and
a processor, configured to execute the computer program so as to implement the data center 5G network encrypted multicast-based authority authentication method.

The present disclosure also provides a readable storage medium, configured to store a computer program that is executed by a processor to implement the data center 5G network encrypted multicast-based authority authentication method.

The effects provided in the SUMMARY are not all effects of the present disclosure but only effects of the embodiments. One of the above technical solutions has the following advantages or beneficial effects.

Compared with the prior art, the present disclosure has the following advantages. Authority authentication and data connection are performed on each platform of a data center by 5G network encrypted multicast, and a network encrypted multicast component is configured on the platform of the data center. An encrypted multicast packet is sent to a network by the platform. Connection is completed by handshaking and mutual heartbeat transmission between the platforms. Authority verification is performed through the multicast packet. In this manner, the problem of security risk of traditional authority authentication may be reduced, and the intercommunication speed and efficiency of each platform of the data center may be improved greatly.

DETAILED DESCRIPTION

Figure 1:
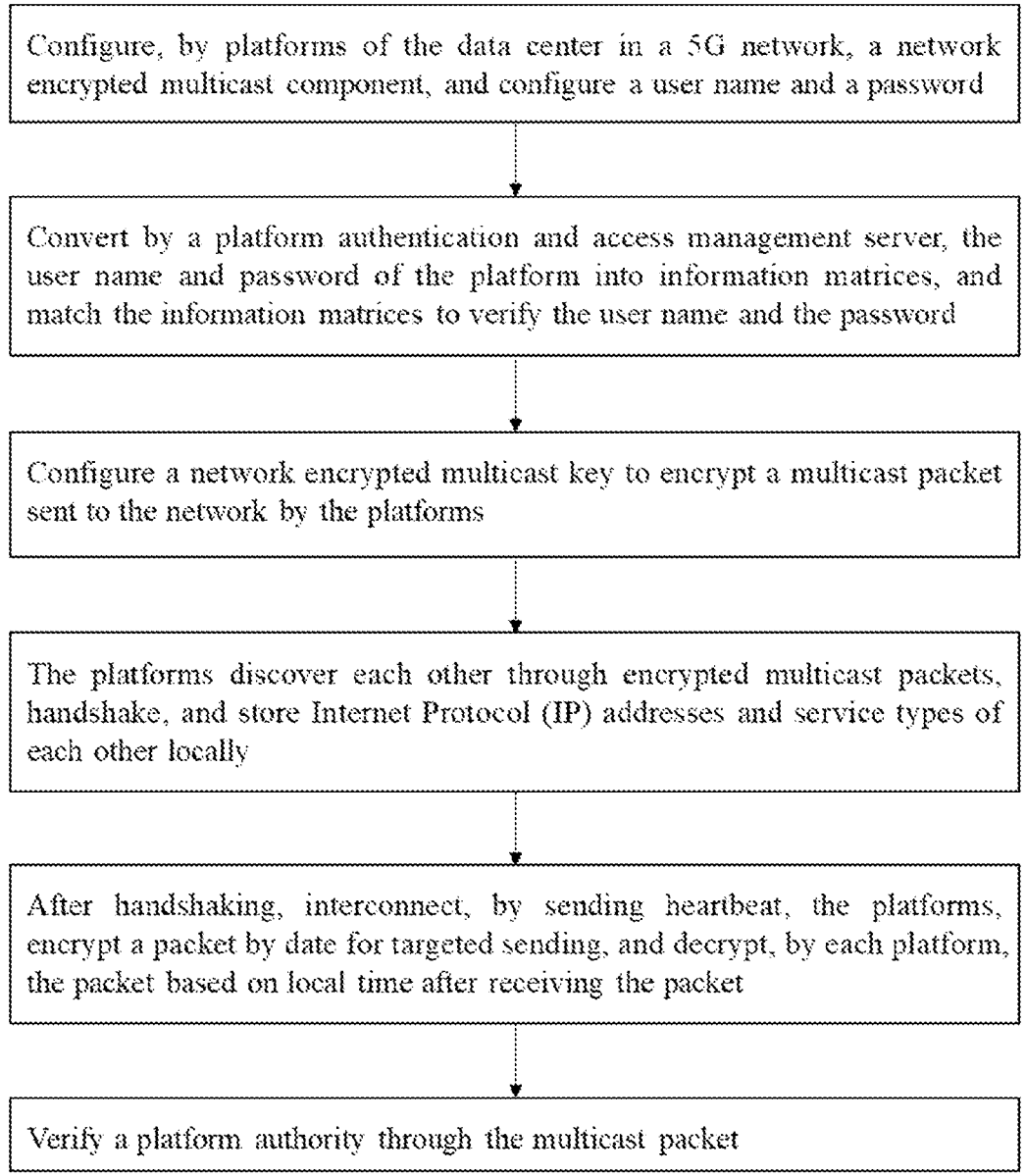
FIG. 1 is a flowchart of a data center 5G network encrypted multicast-based authority authentication method according to an embodiment of the present disclosure.

In order to describe the technical characteristics of the solutions clearly, the present disclosure will be described below in detail with specific implementation modes in combination with the drawings. The above disclosure provides many different embodiments or examples to implement different structures of the present disclosure. To simplify the disclosure of the present disclosure, components and arrangements in specific examples are described below. In addition, in the present disclosure, reference numerals and/or letters may be reused in different examples. Such reuse is for brevity and clarity and does not indicate a relationship between each embodiment and/or arrangement that is discussed. It is to be noted that the components shown in the drawings are not necessarily drawn to scale. Descriptions about known components and processing technologies and processes are omitted in the present disclosure so as to avoid unnecessary limitations on the present disclosure.

A data center 5G network encrypted multicast-based authority authentication method and system provided in embodiments of the present disclosure will be described below in detail in combination with the drawings.

As shown in FIG. 1, the present disclosure discloses a data center 5G network encrypted multicast-based authority authentication method, including the following operations.

configuring, by platforms of the data center in a 5G network, a network encrypted multicast component, and configuring a user name and a password;

converting, by a platform authentication and access management server, the user name and password of the platform into information matrices, and matching the information matrices to verify the user name and the password;

configuring a network encrypted multicast key to encrypt a multicast packet sent to the network by the platforms;

the platforms discovering each other through encrypted multicast packets, handshaking, and storing Internet Protocol (IP) addresses and service types of each other locally;

after handshaking, interconnecting, by sending heartbeat, the platforms, encrypting a packet by date for targeted sending, and decrypting, by each platform, the packet based on local time after receiving the packet;

verifying a platform authority through the multicast packet.

It is assumed that there are four platforms A, B, C, and D in a 5G network. The four platforms communicate through different network cards respectively. Each platform needs to be matched with a network encrypted multicast component for use. The component has a unique identifier. The network encrypted multicast component is configured with a supreme administrator authority and dedicated encrypted code for local login, and sends a specific encrypted multicast to the whole network according to a configuration item.

A user configures an own user name and password first on platform A. A platform authentication and access management server converts the input user name and password into a user name information matrix and a password information matrix. Whether there is a matched password information matrix and user name information matrix in the platform authentication and access management server is queried. If both are matched successfully, ciphertext configuration is performed.

After the user name and the password pass verification, a network encrypted multicast key is configured to encrypt a packet during automatic locating of a matched platform. The key of each platform needs to be the same.

A multicast packet sent to the network by each of the four platforms A, B, C, and D in the network includes a local IP address, a local service type, a local unique identifier, a ciphertext, and a MAC address. A multicast encryption mode is a Message Digest 5 (MD5) signature: data+"&key="+md5Key, wherein md5Key is a specified MD5 signature key. All sent or received data is set as set M. Parameters with non-null parameter values in set M are sequenced from small to large American Standard Code for Information Interchange (ASCII) of parameter names to obtain a character string. Character string data is obtained by concatenation in a key-value pair format. key is concatenated to the end of data, and an MD5 operation is performed to obtain a signature value.

When platforms A and B discover each other by encrypted multicast plus ciphertext comparison, the two platforms handshake, and store IP addresses and service types of each other locally.

After successful handshaking, the two platforms need to detect the existence of each other by mutual heartbeat sending. Here, this operation is still implemented by network encrypted multicast. After interconnection is completed, a whole packet is encrypted by date for targeted sending. Each platform decrypts the packet based on local time after receiving the packet. The packet is an exception packet if decryption fails.

Detailed packet verification during network multicast authority authentication is as follows:

A: checking whether a global IP white list is hit; if YES, determining that verification succeeds, and performing step D; otherwise, performing step B;

B: checking whether a user IP white list is hit; if YES, determining that verification succeeds, and performing step D; otherwise, performing step C;

C: verifying a ciphertext, throwing an exception if verification fails, and performing step D if verification succeeds;

D: verifying an authority required by a request of a user and an authority of the user, and throwing an exception if verification fails.

According to the embodiment of the present disclosure, authority authentication and data connection are performed on each platform of a data center by 5G network encrypted multicast, and a network encrypted multicast component is configured on the platform of the data center. An encrypted multicast packet is sent to a network by the platform. Connection is completed by handshaking and mutual heartbeat transmission between the platforms. Authority verification is performed through the multicast packet. In this manner, the problem of security risk of traditional authority authentication may be reduced, and the intercommunication speed and efficiency of each platform of the data center may be improved greatly.

Figure 2:
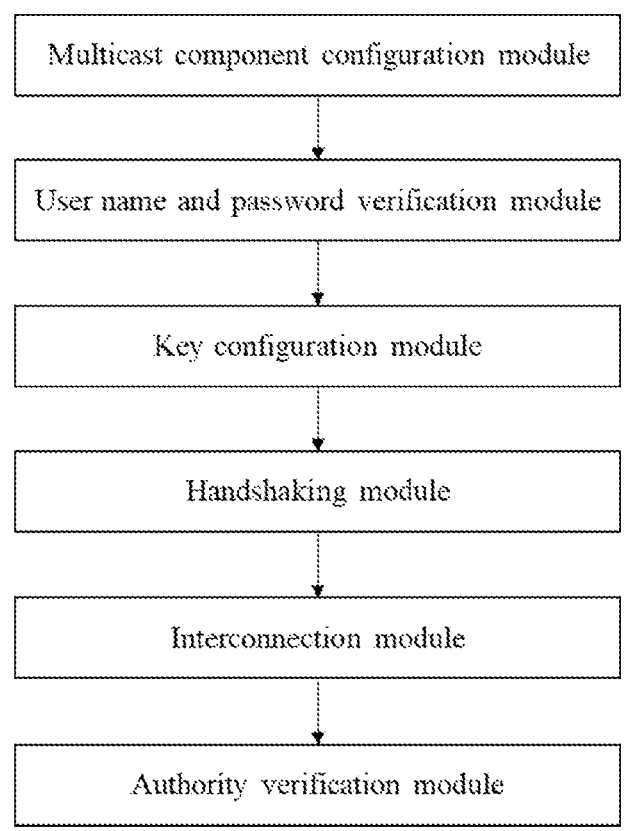
FIG. 2 is a block diagram of a data center 5G network encrypted multicast-based authority authentication system according to an embodiment of the present disclosure.

As shown in FIG. 2, the embodiments of the present disclosure also disclose a data center 5G network encrypted multicast-based authority authentication system, including:

a multicast component configuration module, configured to configure, by platforms of the data center in a 5G network, a network encrypted multicast component, and configure a user name and a password;

a user name and password verification module, configured to convert, by a platform authentication and access management server, the user name and password of the platform into information matrices, and match the information matrices to verify the user name and the password;

a key configuration module, configured to configure a network encrypted multicast key to encrypt a multicast packet sent to the network by the platforms;

a handshaking module, configured for the platforms discovering each other through encrypted multicast packets, handshaking, and storing Internet Protocol (IP) addresses and service types of each other locally;

an interconnection module, configured to, after handshaking, interconnect, by sending heartbeat, the platforms, encrypt a packet by date for targeted sending, and decrypt, by each platform, the packet based on local time after receiving the packet;

an authority verification module, configured to verify a platform authority through the multicast packet.

It is assumed that there are four platforms A, B, C, and D in a 5G network. The four platforms communicate through different network cards respectively. Each platform needs to be matched with a network encrypted multicast component for use. The component has a unique identifier. The network encrypted multicast component is configured with a supreme administrator authority and dedicated encrypted code for local login, and sends a specific encrypted multicast to the whole network according to a configuration item.

A user configures an own user name and password first on platform A. A platform authentication and access management server converts the input user name and password into a user name information matrix and a password information matrix. Whether there is a matched password information matrix and user name information matrix in the platform authentication and access management server is queried. If both are matched successfully, ciphertext configuration is performed. After the user name and the password pass verification, a network encrypted multicast key is configured to encrypt a packet during automatic locating of a matched platform. The key of each platform needs to be the same.

A multicast packet sent to the network by each of the four platforms A, B, C, and D in the network includes a local IP address, a local service type, a local unique identifier, a ciphertext, and a MAC address. A multicast encryption mode is an MD5 signature: data+"&key="+md5Key, wherein md5Key is a specified MD5 signature key. All sent or received data is set as set M. Parameters with non-null parameter values in set M are sequenced from small to large ASCII of parameter names to obtain a character string. Character string data is obtained by concatenation in a key-value pair format. key is concatenated to the end of data, and an MD5 operation is performed to obtain a signature value.

When platforms A and B discover each other by encrypted multicast plus ciphertext comparison, the two platforms handshake, and store IP addresses and service types of each other locally.

After successful handshaking, the two platforms need to detect the existence of each other by mutual heartbeat sending. Here, this operation is still implemented by network encrypted multicast. After interconnection is completed, a whole packet is encrypted by date for targeted sending. Each platform decrypts the packet based on local time after receiving the packet. The packet is an exception packet if decryption fails.

Detailed packet verification during network multicast authority authentication is as follows:

A: checking whether a global IP white list is hit; if YES, determining that verification succeeds, and performing step D; otherwise, performing step B;

B: checking whether a user IP white list is hit; if YES, determining that verification succeeds, and performing step D; otherwise, performing step C;

C: verifying a ciphertext, throwing an exception if verification fails, and performing step D if verification succeeds;

D: verifying an authority required by a request of a user and an authority of the user, and throwing an exception if verification fails.

The embodiments of the present disclosure also disclose a data center 5G network encrypted multicast-based authority authentication device, including:

a memory, configured to store a computer program; and a processor, configured to execute the computer program so as to implement the data center 5G network encrypted multicast-based authority authentication method.

The embodiments of the present disclosure also disclose a readable storage medium, configured to store a computer program that is executed by a processor to implement the data center 5G network encrypted multicast-based authority authentication method.

The above is only the preferred embodiment of the present disclosure and not intended to limit the present disclosure. Any modifications, equivalent replacements, improvements, etc., made within the spirit and principle of the present disclosure shall fall within the scope of protection of the present disclosure.

What is claimed is:

1. A data center 5th-Generation (5G) network encrypted multicast-based authority authentication method, comprising:

configuring, by platforms of the data center in a 5G network, a network encrypted multicast component, and configuring a user name and a password;

converting, by a platform authentication and access management server, the user name and password of the platform into information matrices, and matching the information matrices to verify the user name and the password;

configuring a network encrypted multicast key to encrypt a multicast packet sent to the network by the platforms;

the platforms discovering each other through encrypted multicast packets, handshaking, and storing Internet Protocol (IP) addresses and service types of each other locally;

after handshaking, interconnecting, by sending heartbeat, the platforms, encrypting a packet by date for targeted sending, and decrypting, by each platform, the packet based on local time after receiving the packet;

verifying a platform authority through the multicast packet.

2. The data center 5G network encrypted multicast-based authority authentication method according to claim 1, wherein the multicast packet comprises a local IP address, a local service type, a local unique identifier, a ciphertext, and a Media Access Control (MAC) address.

3. The data center 5G network encrypted multicast-based authority authentication method according to claim 1, wherein the network encrypted multicast component has a unique identifier.

4. The data center 5G network encrypted multicast-based authority authentication method according to claim 1, wherein the verifying a platform authority comprises:

A: in response to determining that a global IP white list is hit, determining that verification succeeds, and performing step D, and in response to determining that the global IP white list is not hit, performing step B;

B: in response to determining that a user IP white list is hit, determining that verification succeeds, and performing step D, and in response to determining that the user IP white list is not hit, performing step C;

C: verifying a ciphertext, in response to verification of the ciphertext failing, throwing an exception, and in response to verification of the ciphertext succeeding, performing step D; and D: verifying an authority required by a request of a user and an authority of the user, and in response to verification of the authority required by the request of the user and the authority of the user failing, throwing an exception.

5. The data center 5G network encrypted multicast-based authority authentication method according to claim 1, wherein the network encrypted multicast component is configured with a supreme administrator authority and dedicated encrypted code for local login.

6. The data center 5G network encrypted multicast-based authority authentication method according to claim 5, wherein the network encrypted multicast component is further configured to send a specific encrypted multicast to a whole network according to a configuration item.

7. The data center 5G network encrypted multicast-based authority authentication method according to claim 1, wherein the network encrypted multicast key of each of the platforms is the same.

8. A data center $5^{th}$-Generation (5G) network encrypted multicast-based authority authentication device, comprising:

a memory, configured to store a computer program; and a processor, configured to execute the computer program so as to implement a data center 5G network encrypted multicast-based authority authentication method, wherein the data center 5G network encrypted multicast-based authority authentication method comprises the following operations:

configuring, by platforms of the data center in a 5G network, a network encrypted multicast component, and configuring a user name and a password;

converting, by a platform authentication and access management server, the user name and password of the platform into information matrices, and matching the information matrices to verify the user name and the password;

configuring a network encrypted multicast key to encrypt a multicast packet sent to the network by the platforms;

the platforms discovering each other through encrypted multicast packets, handshaking, and storing Internet Protocol (IP) addresses and service types of each other locally;

after handshaking, interconnecting, by sending heartbeat, the platforms, encrypting a packet by date for targeted sending, and decrypting, by each platform, the packet based on local time after receiving the packet; and verifying a platform authority through the multicast packet.

9. The data center 5G network encrypted multicast-based authority authentication device according to claim 8, wherein the multicast packet comprises a local IP address, a local service type, a local unique identifier, a ciphertext, and a Media Access Control (MAC) address.

10. The data center 5G network encrypted multicast-based authority authentication device according to claim 8, wherein the network encrypted multicast component has a unique identifier.

11. The data center 5G network encrypted multicast-based authority authentication device according to claim 8, wherein the verifying a platform authority comprises:

A: in response to determining that a global IP white list is hit, determining that verification succeeds, and performing step D, and in response to determining that the global IP white list is not hit, performing step B;

B: in response to determining that a user IP white list is hit, determining that verification succeeds, and performing step D, and in response to determining that the user IP white list is not hit, performing step C;

C: verifying a ciphertext, in response to verification of the ciphertext failing, throwing an exception, and in response to verification of the ciphertext succeeding, performing step D; and D: verifying an authority required by a request of a user and an authority of the user, and in response to verification of the authority required by the request of the user and the authority of the user failing, throwing an exception.

12. The data center 5G network encrypted multicast-based authority authentication device according to claim 8, wherein the network encrypted multicast component is configured with a supreme administrator authority and dedicated encrypted code for local login.

13. The data center 5G network encrypted multicast-based authority authentication device according to claim 12, wherein the network encrypted multicast component is further configured to send a specific encrypted multicast to a whole network according to a configuration item.

14. The data center 5G network encrypted multicast-based authority authentication device according to claim 8, wherein the network encrypted multicast key of each of the platforms is the same.

15. A non-transitory readable storage medium, having a computer program stored thereon which, when executed by a processor, implements a data center 5G network encrypted multicast-based authority authentication method, wherein the data center 5G network encrypted multicast-based authority authentication method comprises the following operations: configuring, by platforms of the data center in a 5G network, a network encrypted multicast component, and configuring a user name and a password; converting, by a platform authentication and access management server, the user name and password of the platform into information matrices, and matching the information matrices to verify the user name and the password; configuring a network encrypted multicast key to encrypt a multicast packet sent to the network by the platforms; the platforms discovering each other through encrypted multicast packets, handshaking, and storing Internet Protocol (IP) addresses and service types of each other locally; after handshaking, interconnecting, by sending heartbeat, the platforms, encrypting a packet by date for targeted sending, and decrypting, by each platform, the packet based on local time after receiving the packet; and verifying a platform authority through the multicast packet.

16. The non-transitory readable storage medium according to claim 15, wherein the multicast packet comprises a local IP address, a local service type, a local unique identifier, a ciphertext, and a Media Access Control (MAC) address.

17. The non-transitory readable storage medium according to claim 15, wherein the network encrypted multicast component has a unique identifier.

18. The non-transitory readable storage medium according to claim 15, wherein the verifying a platform authority comprises: A: in response to determining that a global IP white list is hit, determining that verification succeeds, and performing step D, and in response to determining that the global IP white list is not hit, performing step B; B: in response to determining that a user IP white list is hit, determining that verification succeeds, and performing step D, and in response to determining that the user IP white list is not hit, performing step C; C: verifying a ciphertext, in response to verification of the ciphertext failing, throwing an exception, and in response to verification of the ciphertext succeeding, performing step D; and D: verifying an authority required by a request of a user and an authority of the user, and in response to verification of the authority required by the request of the user and the authority of the user failing, throwing an exception.

19. The non-transitory readable storage medium according to claim 15, wherein the network encrypted multicast component is configured with a supreme administrator authority and dedicated encrypted code for local login.

20. The non-transitory readable storage medium according to claim 19, wherein the network encrypted multicast component is further configured to send a specific encrypted multicast to a whole network according to a configuration item.

* * * * *